(12) United States Patent
Kim et al.

(10) Patent No.: US 10,152,468 B2
(45) Date of Patent: Dec. 11, 2018

(54) MOBILE TERMINAL AND METHOD OF SHARING ADDITIONAL INFORMATION ON WEB PAGE

(71) Applicant: LG ELECTRONICS INC., Seoul (KR)

(72) Inventors: Yonghyun Kim, Seoul (KR); Yunjung Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 495 days.

(21) Appl. No.: 14/068,885

(22) Filed: Oct. 31, 2013

(65) Prior Publication Data

US 2014/0223282 A1 Aug. 7, 2014

(30) Foreign Application Priority Data

Feb. 1, 2013 (KR) .................. 10-2013-0011974

(51) Int. Cl.
*G06F 17/00* (2006.01)
*G06F 17/24* (2006.01)
G06F 3/0484 (2013.01)
G06F 17/22 (2006.01)
G06Q 10/10 (2012.01)

(52) U.S. Cl.
CPC ............ *G06F 17/241* (2013.01); *G06F 17/24* (2013.01); *G06F 3/04842* (2013.01); *G06F 17/2247* (2013.01); *G06Q 10/101* (2013.01)

(58) Field of Classification Search
CPC ............... G06F 17/241; G06F 17/2247; G06F 3/04842; G06F 17/24; G06Q 10/101
See application file for complete search history.

(56) References Cited

U.S. PATENT DOCUMENTS

| 7,149,776 | B1* | 12/2006 | Roy .................. G06F 17/30873 |
| | | | 709/205 |
| 7,546,571 | B2* | 6/2009 | Mankin ............... G06F 17/5045 |
| | | | 700/103 |
| 8,806,024 | B1* | 8/2014 | Toba Francis .... G06F 17/30873 |
| | | | 709/227 |
| 2003/0214528 | A1* | 11/2003 | Pierce .................. G06F 17/241 |
| | | | 715/723 |
| 2004/0019611 | A1* | 1/2004 | Pearse ............... G06F 17/30887 |
| 2005/0165852 | A1* | 7/2005 | Albornoz .......... G06F 17/30997 |
| 2006/0101368 | A1* | 5/2006 | Kesarwani .......... G06F 17/5045 |
| | | | 716/137 |
| 2007/0055926 | A1* | 3/2007 | Christiansen ......... G06F 17/241 |
| | | | 715/210 |

(Continued)

*Primary Examiner* — Cesar B Paula
*Assistant Examiner* — David Faber
(74) *Attorney, Agent, or Firm* — Birch, Stewart, Kolasch & Birch, LLP

(57) ABSTRACT

The present disclosure provides a mobile terminal including a wireless communication unit connected to a server providing first screen information matched to a preset address, a display unit configured to display the first screen information, a user input unit configured to receive a touch input for entering additional information on the first screen information, and a controller configured to control the display unit to display second screen information containing the first screen information and the additional information, and change the first screen information matched to the address to the second screen information.

15 Claims, 14 Drawing Sheets

(56) References Cited

U.S. PATENT DOCUMENTS

| | | | | |
|---|---|---|---|---|
| 2007/0258100 | A1* | 11/2007 | Kano | G06F 17/21 358/1.5 |
| 2007/0300160 | A1* | 12/2007 | Ferrel | G06F 17/30867 715/744 |
| 2008/0119235 | A1* | 5/2008 | Nielsen | G06F 3/0483 455/566 |
| 2009/0150397 | A1* | 6/2009 | Chen | G06F 17/30722 |
| 2010/0070878 | A1* | 3/2010 | Amento | G11B 27/034 715/751 |
| 2010/0156913 | A1* | 6/2010 | Ortega | G06F 3/1438 345/520 |
| 2010/0191799 | A1* | 7/2010 | Fiedorowicz | G06F 17/30873 709/203 |
| 2011/0040644 | A1* | 2/2011 | Juda | G06F 17/241 705/26.3 |
| 2011/0113320 | A1* | 5/2011 | Neff | G06Q 10/10 715/230 |
| 2012/0278738 | A1* | 11/2012 | Kruse | G06Q 10/10 715/754 |
| 2012/0317479 | A1* | 12/2012 | Safa | G06F 17/2288 715/256 |
| 2013/0031457 | A1* | 1/2013 | Griffiths | G06F 17/241 715/231 |
| 2013/0097549 | A1* | 4/2013 | Park | G06F 3/04886 715/773 |
| 2014/0258888 | A1* | 9/2014 | Varadarajan | G06F 3/0481 715/753 |
| 2015/0220504 | A1* | 8/2015 | Bocanegra Alvarez | G06F 17/241 715/233 |

* cited by examiner

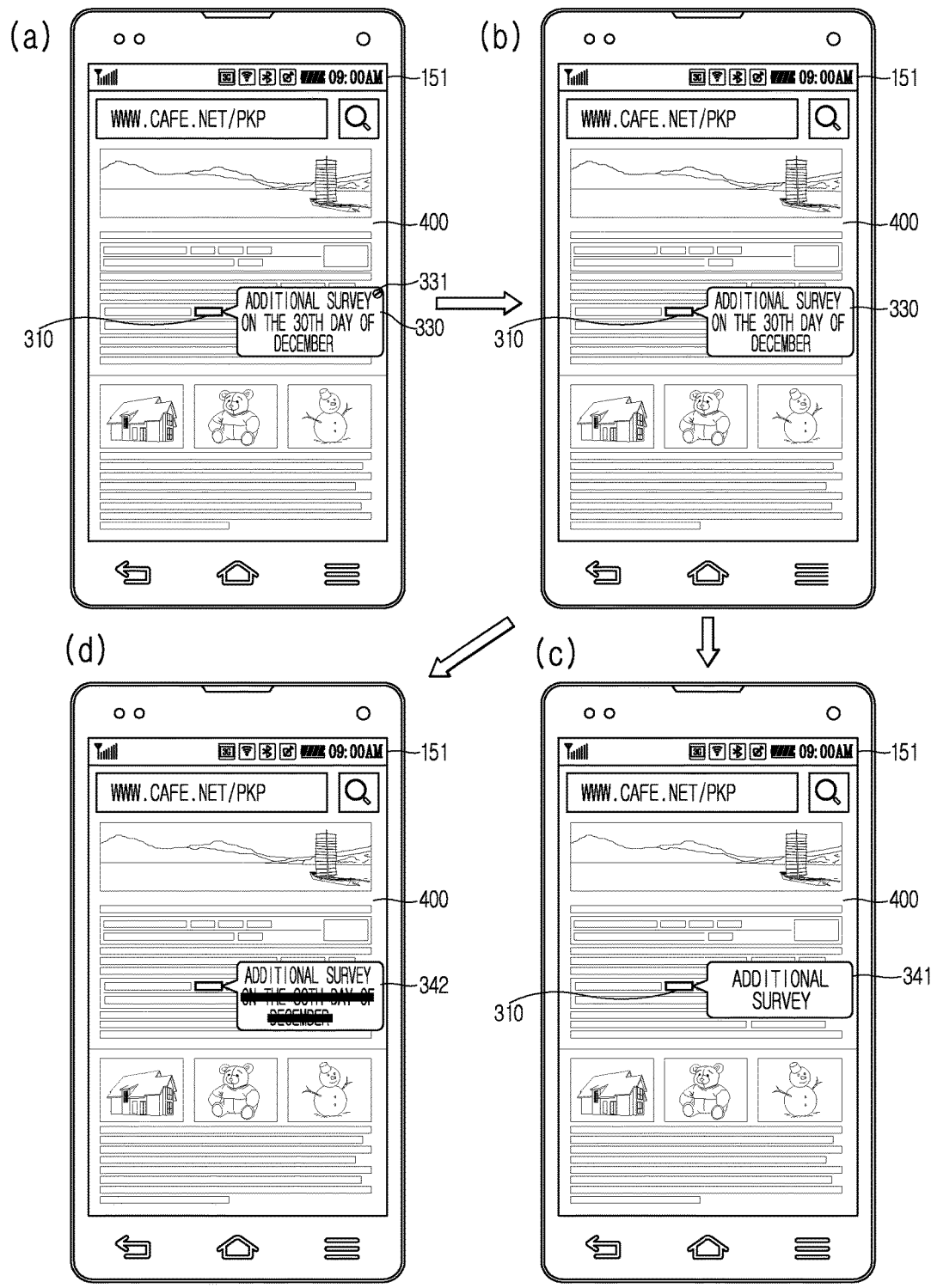

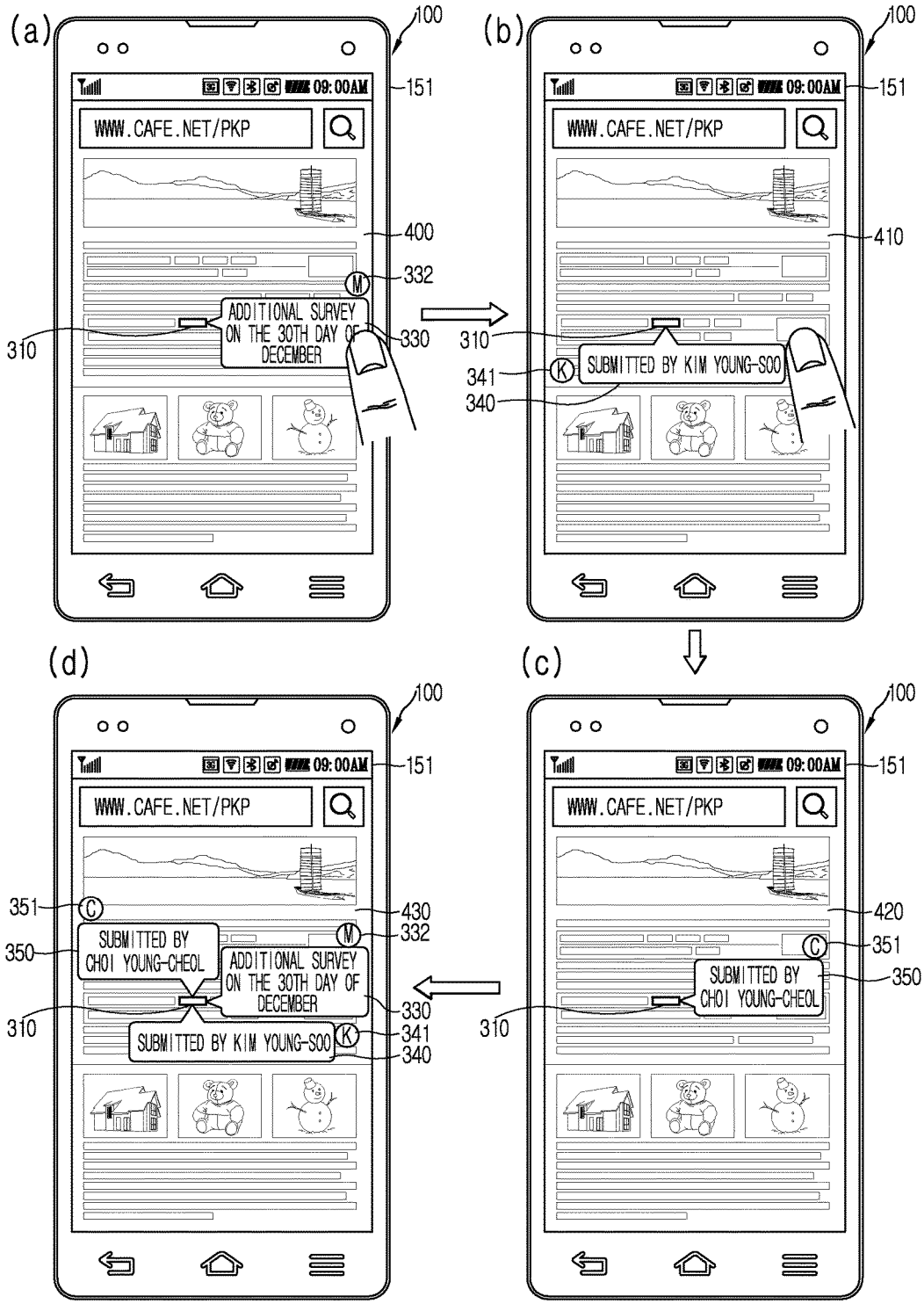

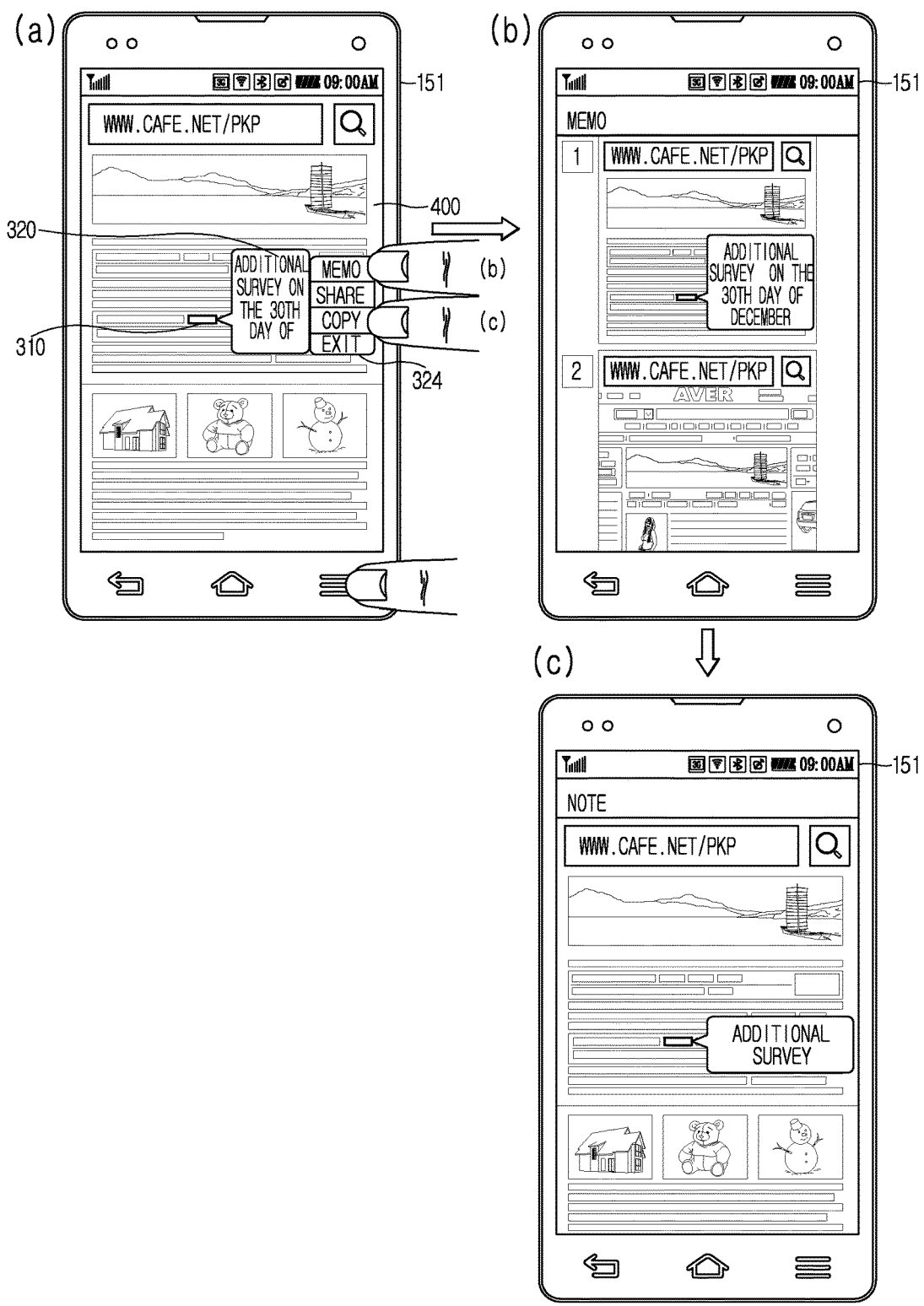

MOBILE TERMINAL AND METHOD OF SHARING ADDITIONAL INFORMATION ON WEB PAGE

RELATED APPLICATION

Pursuant to 35 U.S.C. § 119(a), this application claims the benefit of earlier filing date and right of priority to Korean Application No. 10-2013-0011974, filed in filed in Republic of Korea on Feb. 1, 2013 the contents of which are incorporated by reference herein in it entirety.

BACKGROUND OF THE INVENTION

1. Field of the Invention

The present disclosure relates to a mobile terminal capable of modification of screen information corresponding to a URL address.

2. Description of the Related Art

Terminals can be classified into two types, such as a mobile or portable terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player. Moreover, the improvement of structural or software elements of the terminal may be taken into consideration to support and enhance the functions of the terminal.

In recent years, technologies for allowing a plurality of users to receive and share the same screen information corresponding to an address in a server using a mobile terminal have been developed. However, the screen information corresponding to an address cannot be modified. Furthermore, in order to share modified information, the process of converting the modified information into images and text and storing and transferring them in the mobile terminal should be carried out, which is an inconvenience.

SUMMARY OF THE INVENTION

Accordingly, a technical task of the present disclosure is to configure a mobile terminal capable of modification of the content of screen information corresponding to a URL address.

In order to accomplish the foregoing task of the present disclosure, a mobile terminal according to an embodiment of the present disclosure may include a wireless communication unit connected to a server providing first screen information matched to a preset address, a display unit configured to display the first screen information, a user input unit configured to receive a touch input for entering additional information on the first screen information, and a controller configured to control the display unit to display second screen information containing the first screen information and the additional information, and change the first screen information matched to the address to the second screen information.

As an example associated with the present disclosure, the mobile terminal may further include a memory configured to store the additional information and a specific coordinate of the first screen information at which the additional information is formed.

As an example associated with the present disclosure, the controller may control the wireless communication unit to transmit the address and a signal for the second screen information matched to the address to the server.

As an example associated with the present disclosure, the controller may control the memory to store the second screen information by converting it into a hypertext markup language (HTML).

As an example associated with the present disclosure, when a modified item is formed on the second screen information by an external terminal, the controller may control the display unit to display the modified second screen information.

As an example associated with the present disclosure, the controller may control the display unit to display the second screen information and the modified second screen information.

As an example associated with the present disclosure, the additional information may include the identification information of the mobile terminal to distinguish it from an item modified by the external terminal.

As an example associated with the present disclosure, the controller may control the display unit to display the additional information when a touch input is applied to a graphic image corresponding to the additional information and contained in the second screen information.

As an example associated with the present disclosure, the additional information may be displayed to cover one region of the first screen information.

As an example associated with the present disclosure, the first screen information may include a plurality of contents having each coordinate, and the controller controls the display unit to change the coordinate of the content so as to change a region in which the content is displayed when entering the additional information.

As an example associated with the present disclosure, the additional information may include the unique information of the mobile terminal, and the controller may control the display unit to allow source indication corresponding to the unique information to be displayed adjacent to the additional information.

In order to accomplish the foregoing task of the present disclosure, there is a control method of a mobile terminal, and the control method may include connecting to a server, receiving first screen information matched to a specific address from the server, and displaying the first screen information, receiving a touch input for entering additional information, and displaying second screen information containing the first screen information and the additional information based on the touch input.

As an example associated with the present disclosure, the control method of the mobile terminal may further include storing the second screen information by matching it to the address.

As an example associated with the present disclosure, the control method of the mobile terminal may further include displaying second screen information containing the additional information matched to the address and changed by an external terminal when connecting to the address again.

As an example associated with the present disclosure, said receiving a touch input for entering additional information may include recognizing the unique information of the mobile terminal, and receiving a control command for limiting the change of the additional information by an external terminal having another unique information.

According to the present disclosure information corresponding to a specific address may be changed by receiving it through a server, and the changed information may be received even when receiving information at the same address again.

Furthermore, screen information matched to an address contained in the server can be changed, thereby allowing screen information changed by a user to be received at an external terminal as well as the user's mobile terminal.

Accordingly, information stored in the server can be changed according to the user's convenience and easily shared by others.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 7 is a conceptual view for explaining a control method for modifying additional information contained in second screen information;

FIGS. 8A through 8C are conceptual views for explaining a control method for displaying content added by the user of a mobile terminal to be distinguished from that added by another user; and FIG. 9 is a view illustrating a control method for storing the content of the second screen information in the mobile terminal.

DETAILED DESCRIPTION OF THE INVENTION

Figure 1:
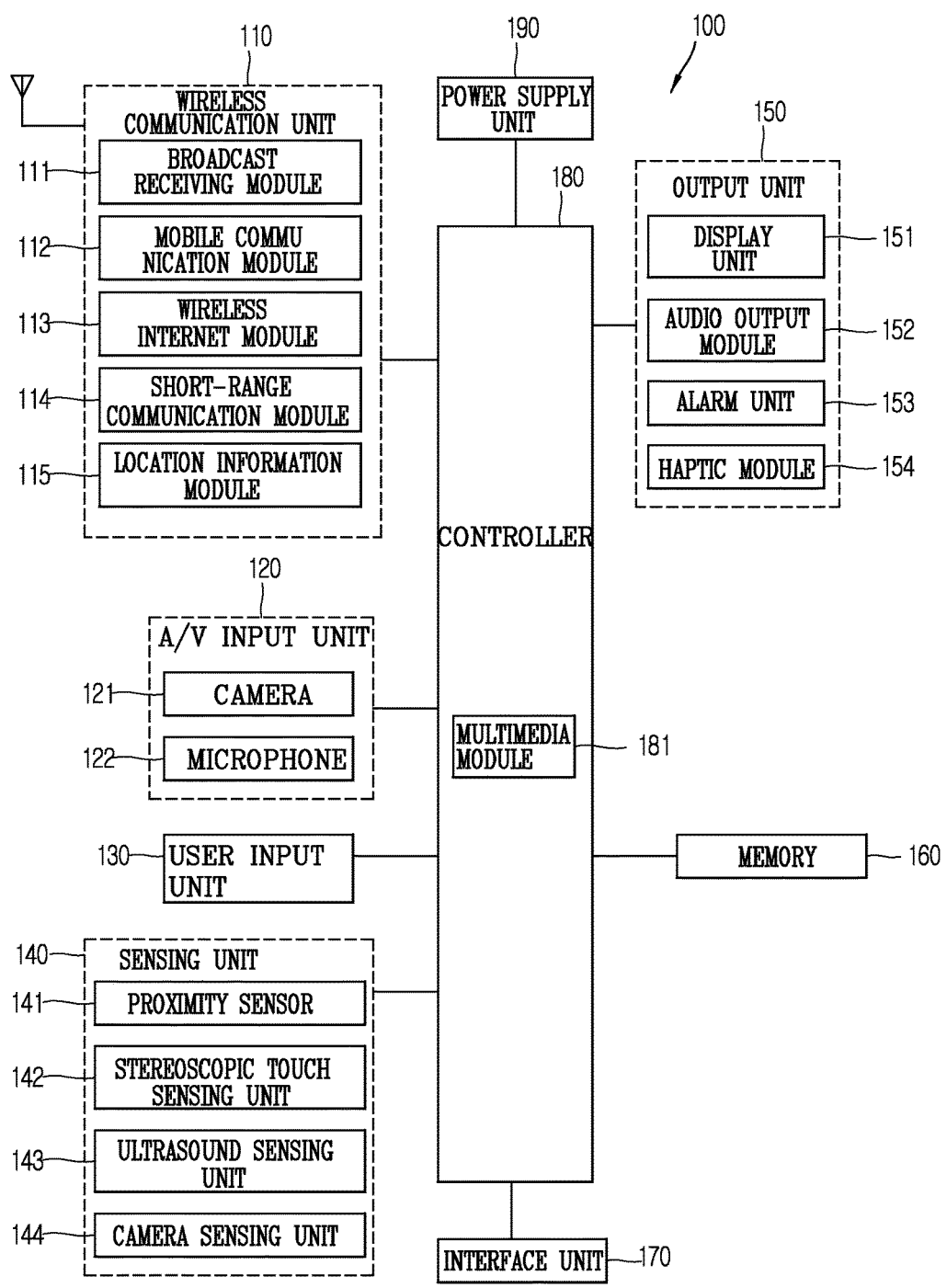
FIG. 1 is a block diagram illustrating a mobile terminal according to an embodiment disclosed in the present disclosure.

Hereinafter, preferred embodiments of the present invention will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not imply any special meaning or function. In describing the present invention, moreover, a detailed description will be omitted when a specific description of publicly known technologies to which the invention pertains may obscure the present invention. Also, it should be noted that the accompanying drawings are merely illustrated to easily explain the concept of the invention, and therefore, they should not be construed to limit the technological concept disclosed herein regarding the accompanying drawings.

A mobile terminal disclosed herein may include a portable phone, a smart phone, a laptop computer, a digital broadcast mobile device, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB- T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement an video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal, and there is a Global Positioning Module (GPS) module or Wireless Fidelity (WiFI) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 153, an alarm unit 154, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

Furthermore, the display unit 151 may be configured with a stereoscopic display unit 152 for displaying a stereoscopic image.

Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Here, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit (not shown). The stereoscopic processing unit receives a 3D image to extract a left image and a right image from the 3D image, or receives a 2D image to convert it into a left image and a right image.

In a case that the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, a ultrasound sensing unit 143, and a camera sensing unit 144.

The proximity sensor 141 measures a distance between the sensing object (for example, the user's finger or stylus pen) and a detection surface to which a touch is applied using an electromagnetic field or infrared rays without a mechanical contact. The terminal may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound.

For example, the ultrasound sensing unit 143 may be configured with an optical sensor and a plurality of ultrasound sensors. The optical sensor may be formed to sense light, and the ultrasound sensor may be formed to sense ultrasound waves. Since light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor.

For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

For another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input carried out on the touch screen as text or image.

Furthermore, the controller 180 may implement a lock state for limiting the user's control command input to applications when the state of the mobile terminal satisfies a preset condition. Furthermore, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Each of the software modules may perform at least one function or operation described in the present disclosure.

Software codes can be implemented by a software application written in any suitable programming language. The software codes may be stored in the memory 160 and executed by the controller 180.

Figure 2A:
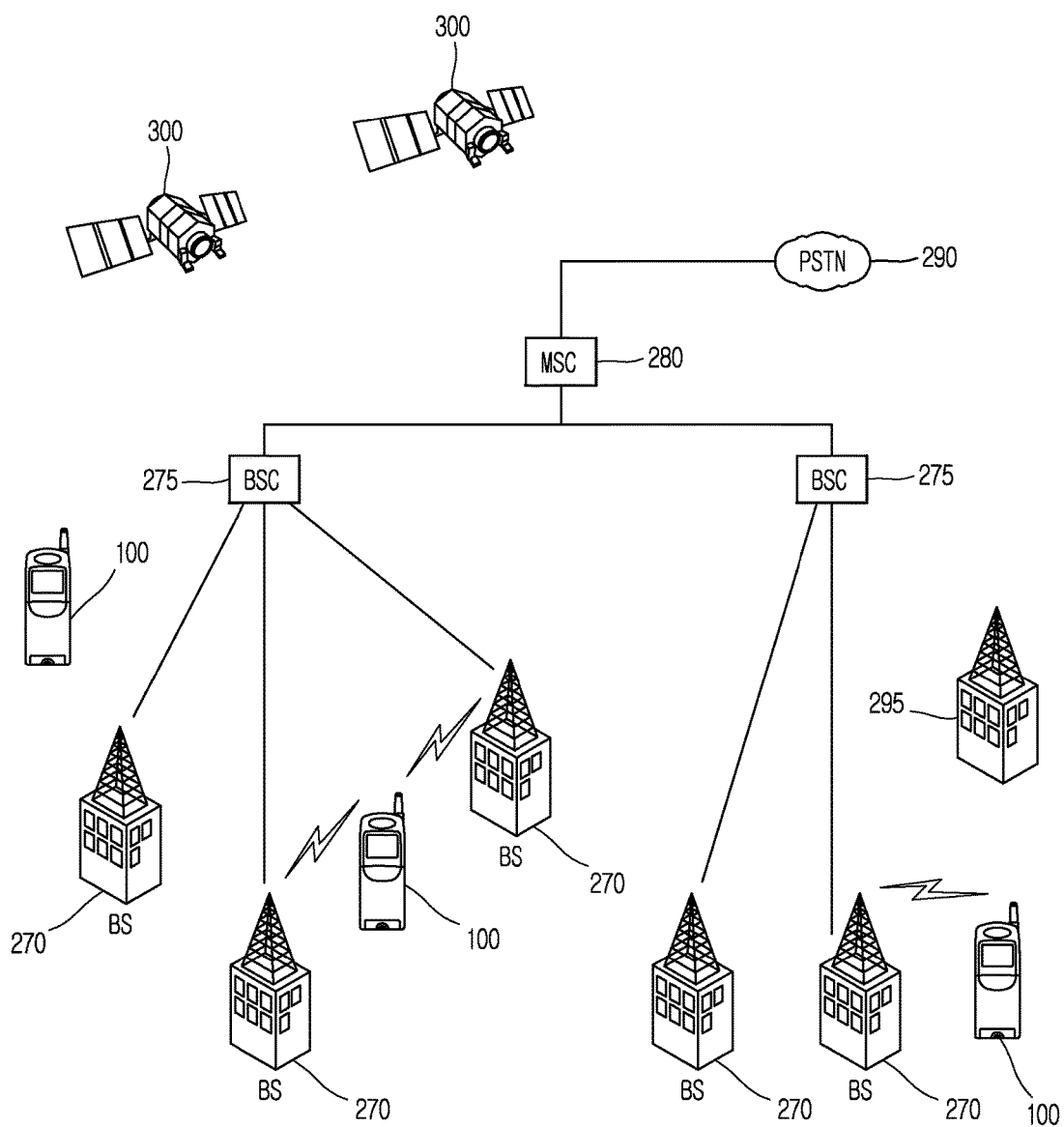
FIGS. 2A and 2B are conceptual views illustrating a communication system in which a mobile terminal according to the present disclosure is operable.
Figure 2B:
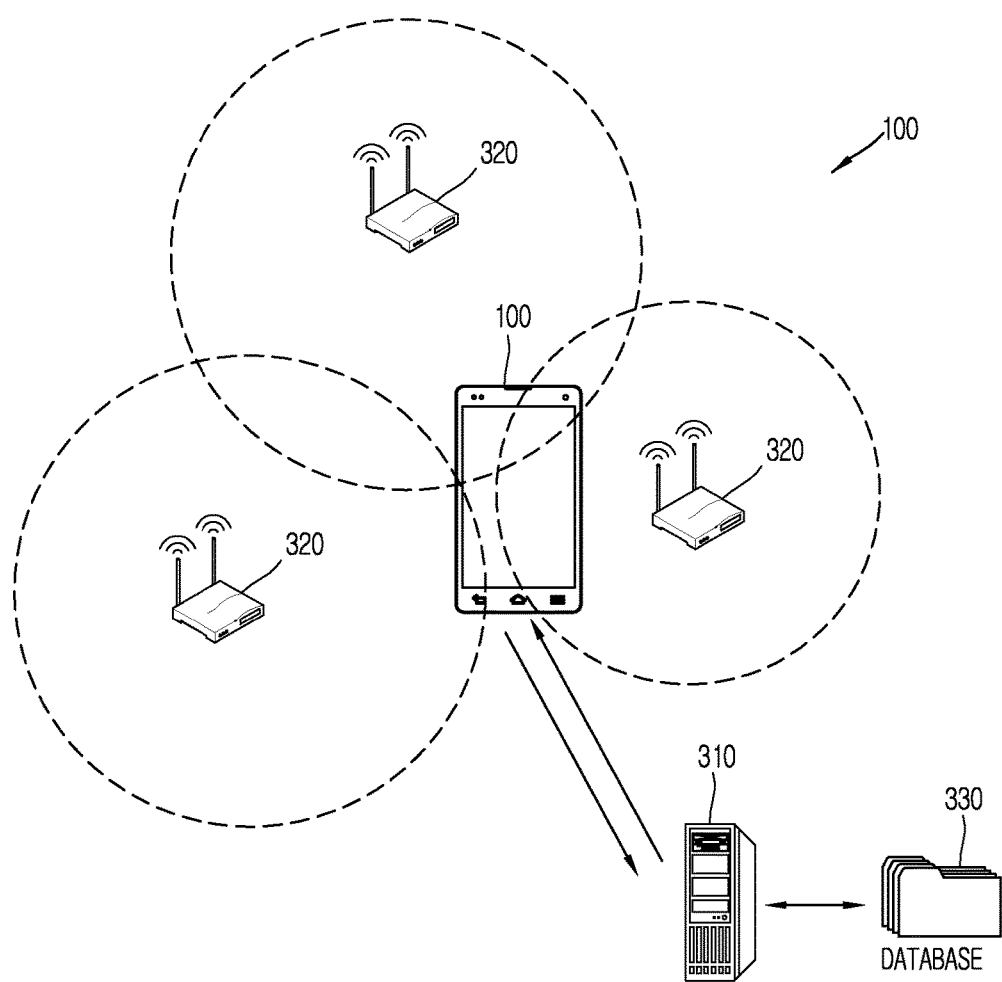

Next, a communication system that can be implemented through the mobile terminal 100 according to the present disclosure will be described. FIGS. 2A and 2B are conceptual views illustrating a communication system in which a mobile terminal 100 according to the present disclosure is operable.

First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, for the sake of convenience of explanation, the description disclosed herein will be limited to CDMA. However, it is apparent that the present invention may be also applicable to all communication systems including a CDMA wireless communication system.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this case, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the mobile terminals 100 being operated within the system. The broadcast receiving module 111 as illustrated in FIG. 1 may be provided in the mobile terminal 100 to receive broadcast signals transmitted by the BT 295.

In addition, FIG. 2A illustrates several global positioning system (GPS) satellites 300. Such satellites 300 facilitate locating at least one of a plurality of mobile terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various mobile terminals 100. At this time, he mobile terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft handoffs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the mobile terminals 100.

Next, a method of acquiring the location information of a mobile terminal using a WiFi (Wireless Fidelity) positioning system (WPS) will be described with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Figure 3A:
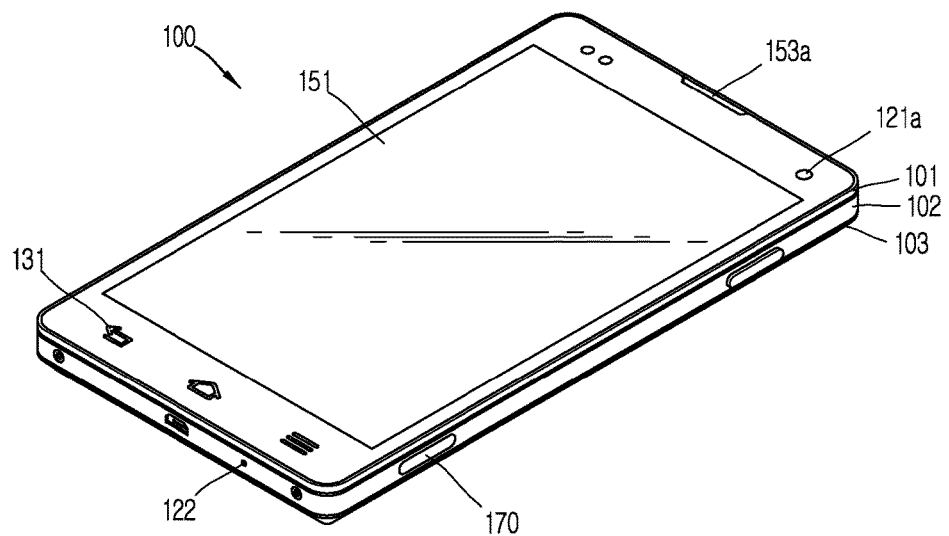
FIG. 3A is a front perspective view illustrating an example of a mobile terminal associated with the present disclosure.

FIG. 3A is a front perspective view illustrating an example of the mobile terminal 100 associated with the present disclosure.

The mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components is incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
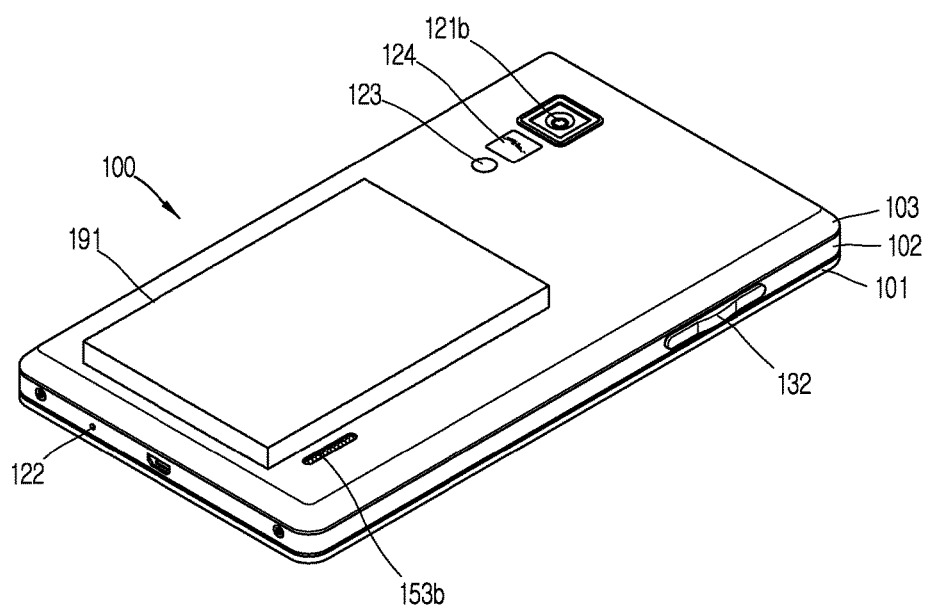
FIG. 3B is a rear perspective view illustrating a mobile terminal illustrated in FIG. 3A.

FIG. 3B is a rear perspective view illustrating mobile terminal 100 illustrated in FIG. 3A.

Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

Furthermore, the extracted location information of the mobile terminal 100 may be transmitted to the mobile terminal 100 through the WiFi location determination server 310, thereby allowing the mobile terminal 100 to acquire location information.

Figure 4:
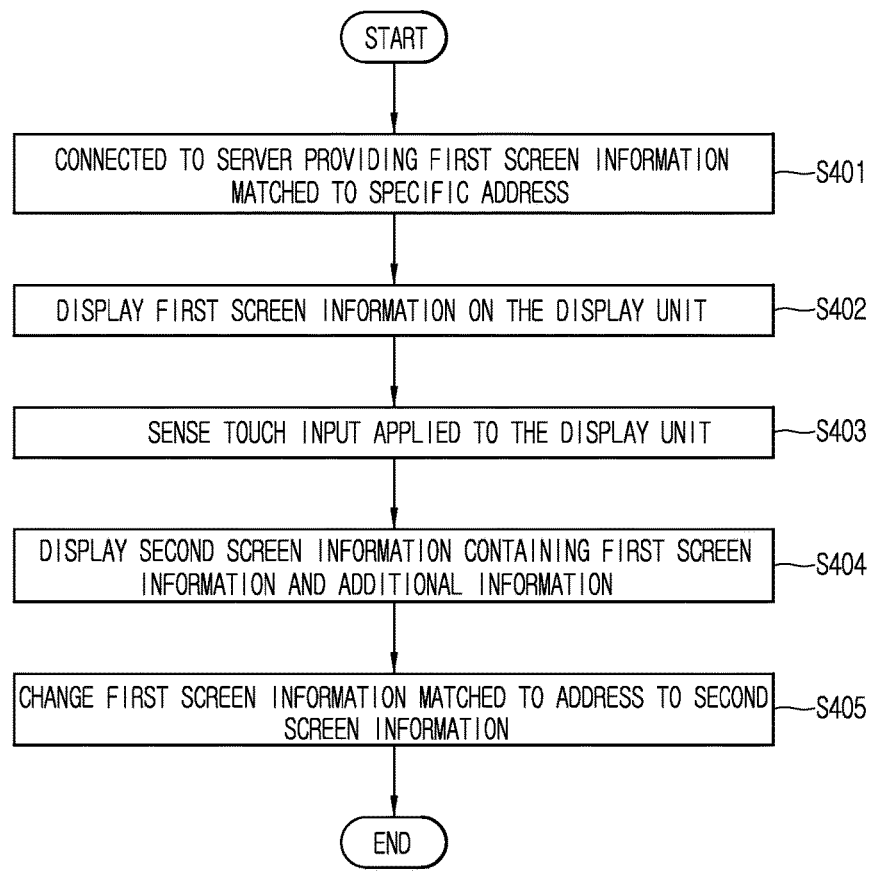
FIG. 4 is a flow chart for explaining a control method according to an embodiment of the present disclosure.
Figure 5:
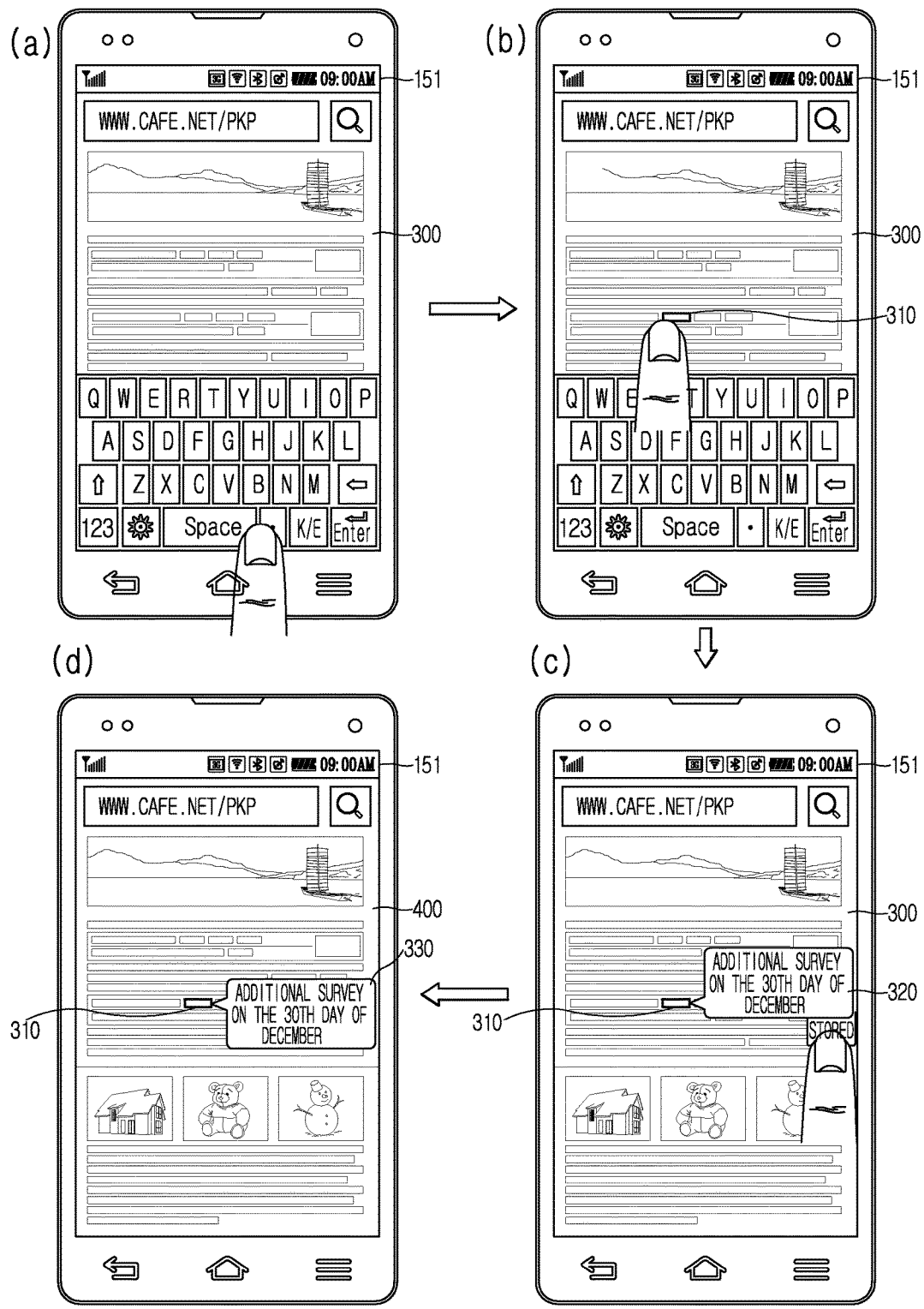
FIG. 5 is a conceptual view for explaining the control method in FIG. 5 according to an embodiment.

FIG. 4 is a flow chart for explaining a control method according to an embodiment of the present disclosure, and FIG. 5 is a conceptual view for explaining the control method in FIG. 5 according to an embodiment.

Referring to FIGS. 4 and 5, the mobile terminal is connected to a server providing first screen information matched to a specific address (S401). The server provides a web browser screen corresponding to a uniform resource locator (URL). For the sake of convenience of explanation, URL corresponding to each web browser screen may be referred to as an address.

The server provides screen information corresponding to each address to various terminals and display devices. Accordingly, a plurality of terminals may receive the substantially same screen information corresponding to the address from the server.

The controller 180 controls the wireless communication unit 110 to receive wireless signals for screen information corresponding to the address based on an address received from a server connected thereto.

Upon receiving the wireless signals, the first screen information 300 is displayed on the display unit (S402). Referring to FIG. 5A, the first screen information 300 may include an address (URL, for example WWW.CAFE.NET/PKP) corresponding to the first screen information and various contents recorded therein. The first screen information 300 may include an address input window capable of entering the address, and the user can enter an address at the address input window to receive screen information which is different from the first screen information 300.

Here, various contents may correspond to text, images, videos, sound effects and the like. The contents contained in the first screen information 300 is arranged by an initially prepared layout, but cannot be changed by the user. However, contents constituting the first screen information 300 may be prepared by a hyper text markup language (HTML). In other words, each content may be carried out using a tag.

Here, the tag of each content constituting the first screen information written by HTML is referred to as a coordinate. In other words, each content of the first screen information is displayed at a location corresponding to a specific coordinate on the first screen information.

A touch input applied to the display unit is sensed (S403). The touch input is provided to enter additional information to the first screen information 300.

The touch input may be applied to one region on the display unit 151 in which the content of the first screen information 300 is displayed or one region on the display unit 151 in which the content is not displayed.

However, the touch input may be preferably distinguished from a touch applied to the display unit 151 to be connected to a hyperlink address contained in the content formed to provide another screen information. For example, the touch input may correspond to a touch input including a long touch input, a double touch input or a preset gesture applied to the display unit 151 for a preset period of time (several seconds).

However, it may not be necessarily limited to this, and a control command may be entered using a signal input unit included in the mobile terminal.

Referring to FIG. 5B, when a touch input is applied to the content, the controller 180 controls the display unit 151 such that an input position 310 on the display unit 151 to which the touch input is applied is processed in a highlighted manner. Accordingly, the user may recognize which region of the first screen information 300 is specified as an input position 310 to which additional information is to be entered.

For example, when the user's touch input is applied to the content of the first screen information 300, the controller 180 may control the display unit 151 to display an edge region of the content in a distinguished manner or change the brightness, color or the like of the content. On the other hand, when the touch input is applied to the margin of the first screen information 300, the controller 180 may control the display unit 151 to display a predetermined shaped image in the margin.

The controller 180 enters additional information to the first screen information based on the touch input. Referring to FIG. 5C, when the touch input is applied, the controller 180 may control the display unit 151 to display a virtual keyboard (for example, QWERTY keyboard) for entering text or the like, and display the input window 320 for entering the text or the like.

The input window 320 may be displayed to cover part of the content constituting the first screen information 300. Text is displayed in the input window 320 based on the user's touch applied to the virtual keyboard. The input window 320 may include a graphic image ("input") for receiving a control command to enter text or the like displayed on the input window 320.

When a touch is applied to the graphic image ("input"), the controller 180 controls the display unit 151 to generate additional information 330 ("additional survey on the 30th day of December") displayed on the first screen information 300.

In other words, the controller 180 controls the display unit 151 to determine the coordinate of the first screen information 300 to which the touch input is applied and display the additional information in a region corresponding to the coordinate.

However, the additional information 330 may not be necessarily limited to text. For example, the additional information 330 may include images, video files, sounds, and the like.

In other words, second screen information 400 containing the first screen information 300 and additional information 330 is displayed on the display unit 151 (S404). Here, a URL address matched to the first screen information 300 displayed in the address input window does not vary.

The additional information 330 may be displayed to cover one region of the first screen information 300. The additional information 330 may be displayed adjacent to the input position 310. Accordingly, the user can add information associated with the input position 310 to the first screen information 300.

When the first screen information 300 and additional information 330 are displayed on the display unit 151, first screen information matched to the address is changed to second screen information (S405).

Specifically, the controller 180 defines the first screen information 300 and additional information 330 and a coordinate on the first screen information 300 at which the additional information 330 is located as the second screen information 400. Furthermore, the controller 180 controls the memory 160 to store the second screen information 400 to be matched to the address.

In other words, when entering the address, information that can be received from the server becomes second screen information other than first screen information.

Moreover, the controller 180 controls the wireless communication unit to transmit a signal for an address matched to the second screen information. Accordingly, information matched to the address received by accessing the server from an external terminal other than the mobile terminal becomes the second screen information 400.

According to the present embodiment, screen information corresponding to a specific address may be changed by receiving it through a server, and the changed information may be received even when receiving information at the same address again.

In addition, screen information matched to an address contained in the server can be changed, thereby allowing screen information changed by a user to be received at an external terminal as well as the user's mobile terminal.

Accordingly, information stored in the server can be changed according to the user's convenience and easily shared by others.

The additional information 330 is stored along with the coordinate of the first screen information 300. Accordingly, it may be displayed in various regions on the first screen information 300. Hereinafter, embodiments of displaying additional information 330 entered on the first screen information 300 by the user will be described.

Figure 6A:
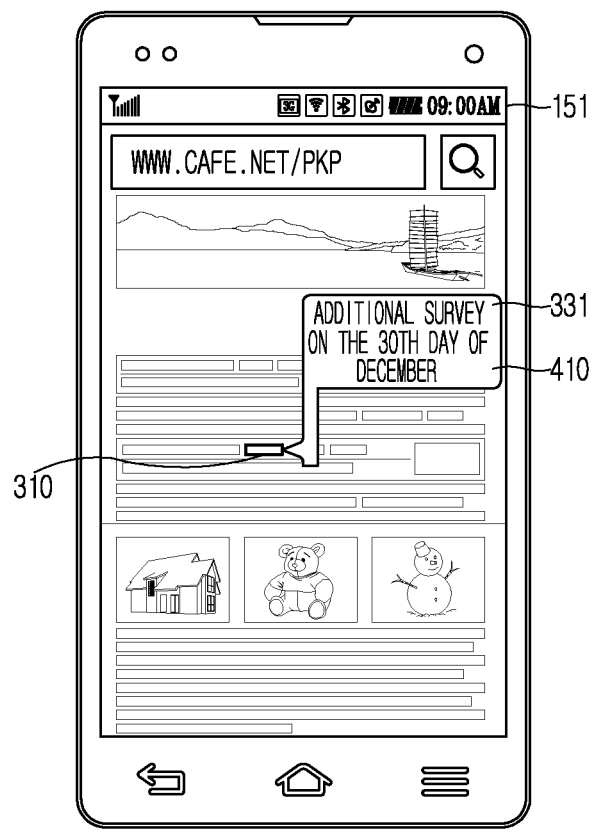
FIGS. 6A through 6C are conceptual views for explaining second screen information containing additional information according to each embodiment.

Referring to FIG. 6A, the controller 180 controls the display unit 151 to display the additional information 330 in the margin in which no content is displayed among the first screen information containing a plurality of contents.

However, the controller 180 may control the display unit 151 to display an arrow or the like connecting the additional information 330 to the input position 310 to indicate that the additional information 330 is information associated with the input position 310.

Figure 6B:
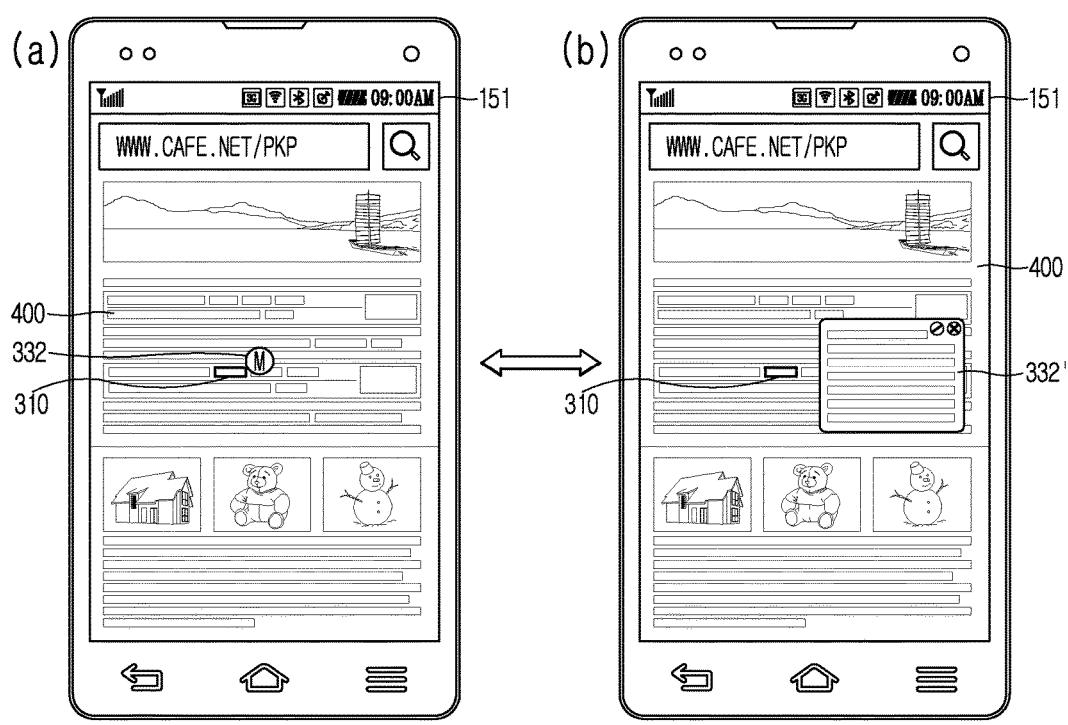

Referring to FIG. 6B, the display unit 151 displays a indicator 332 for receiving a control command activating the additional information. The indicator 332 may be preferably displayed adjacent to the input position 310.

The controller 180 controls the display unit 151 to display the additional information 332' based on a control command applied to the indicator 332. A region on the display unit 151 in which the additional information 332' is displayed may not be limited, but may be preferably displayed adjacent to the input position 310.

On the other hand, when the additional information 330 is displayed, the controller 180 may control the display unit 151 to limit the output of the indicator 332. Furthermore, when the control command is applied to the additional information 332', the controller 180 may control the display unit 151 to limit the output of the additional information 332' and display the indicator 332 again.

In other words, the indicator 332 informs the user that the additional information 332' exists adjacent to the indicator 332. Furthermore, the indicator 332 may be preferably formed not to cover the content constituting the first screen information 300.

The second screen information 400 displays the indicator instead of containing additional information that occupies a relatively large area, and thus content contained in the second screen information is not covered, thereby providing more accurate information to the user.

Furthermore, even when the second screen information includes a plurality of additional information, it may be displayed not to cover the content and each additional information thereof.

Figure 6C:
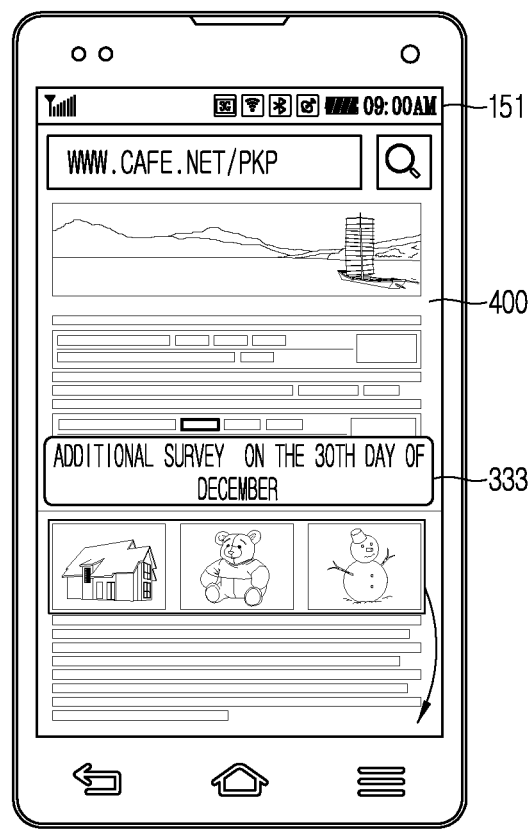

Referring to FIG. 6C, the controller 180 changes the layout of the first screen information 300 to enter the additional information 333. In other words, the layout of the content constituting the first screen information 300 is differently formed from that of the content constituting the second screen information 400.

In other words, the controller 180 controls the display unit 151 to change the layout of the content to form a margin between the contents and enter the additional information 333 to the margin.

For example, the controller 180 controls the display unit 151 to move one region of the first screen information in the downward direction, and enter the additional information 333 to a space formed by moving the one region of the first screen information, namely, a coordinate corresponding to the space.

However, it may not be necessarily limited to this, and may be also controlled such that one region of the first screen information is moved in the vertical or horizontal direction or one region thereof is reduced.

According to the present embodiment, the additional information is displayed not to cover the content contained in the second screen information.

FIG. 7 is a conceptual view for explaining a control method for modifying additional information contained in second screen information.

Referring to FIG. 7A, the display unit 151 displays the second screen information 400 containing the additional information 330 displayed adjacent to the input position 310. The additional information 330 may include an edit icon 331 formed to receive a control command for modifying the additional information 330 ("additional survey on the 30th day of December").

Referring to FIG. 7B, the controller 180 switches the additional information 330 to an edit mode based on a control command applied to the edit icon 331. In other words, the controller 180 controls the display unit 151 to display a cursor or the like for editing the additional information 330 and display a virtual keyboard.

Hereinafter, a control method of editing text "additional survey on the 30th day of December" contained in the additional information 330 will be examined.

Referring to FIG. 7C, first additional information 341 edited by the user's editing is displayed as "additional survey" from which "on the 30th day of December" is deleted. In other words, the controller 180 controls the display unit 151 to display the edited state.

Accordingly the present embodiment, the user cannot recognize a state before being edited but can check only the final additional information after being edited.

On the other hand, referring to FIG. 7D, the controller 180 controls the display unit 151 to display content edited by the user. In other words, the controller 180 controls the display unit 151 to display a strikethrough indicating the deleted "on the 30th day of December" has been deleted.

Accordingly, the user may know the edited content, and recognize initial additional information.

The editing of the additional information may not be necessarily limited to the deletion of text illustrated in FIG. 7. It may include text addition, text shape change, addition or change of various contents and the like.

Furthermore, whether or not to display the edited content may be controlled according to the user's setting, and may be also set when entering the additional information.

On the other hand, the additional information may be edited by another terminal's user who receives second screen information by the address from the server. Even in this case, the controller 180 controls the display unit 151 to display the second screen information by reflecting content edited by the another user.

Furthermore, as illustrated in FIG. 7, the controller 180 may control the display unit 151 to display content edited by another user. Moreover, when users who edit the additional information are a plurality of different persons, the controller 180 may control the display unit 151 to display contents edited by each user to be distinguished from one another.

The controller 180 may control the memory 160 and the wireless communication unit to store second screen information containing the edited additional information by matching it to the address and transmit a signal associated with this to the server.

As described above, additional information may be entered by a plurality of users using different terminals. Hereinafter, a control method of changing first screen information by a plurality of users will be described.

Figure 8A:
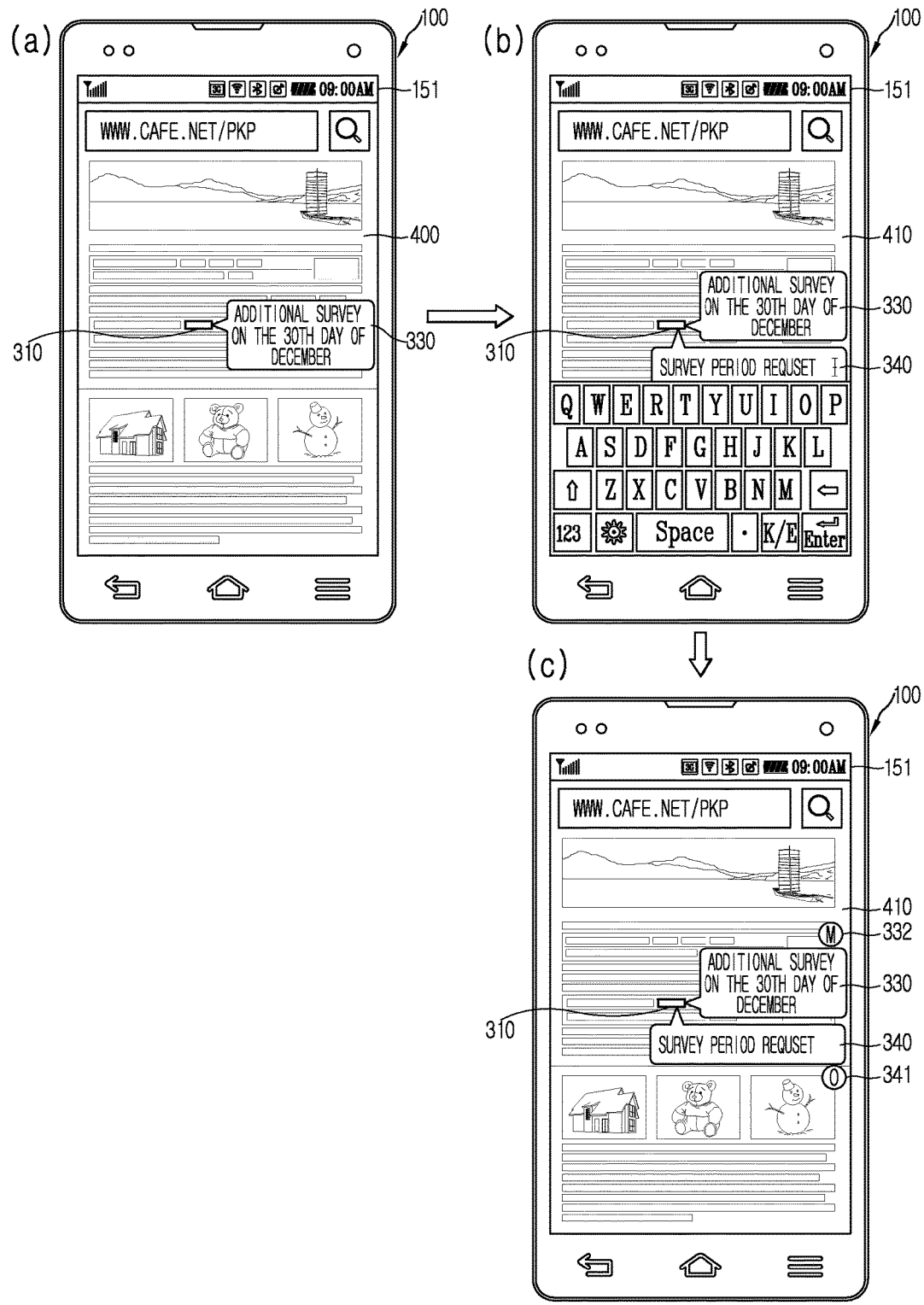

FIG. 8A is a conceptual view for explaining a control method for displaying content added by the user of a mobile terminal to be distinguished from that added by another user.

Referring to FIG. 8A(a), the display unit 151 displays second screen information 400 containing additional information 330 displayed adjacent to the input position 310.

According to the present embodiment, the controller 180 controls the memory 160 to store the mobile terminal 100 to be matched to the identification information of the mobile terminal 100 in the additional information 330 so as to distinguish it from another terminal.

An external terminal 100' which is different from the mobile terminal 100 may also receive the second screen information 400 corresponding to the address from the server.

As examined above, the external terminal 100' may also enter additional information to the second screen information 400. For example, as illustrated in FIG. 8A(b), second additional information 340 may be entered adjacent to the input position 310. The second screen information 400 including the second additional information 340 may be defined as the third screen information 410.

As examined above, the second additional information 340 may include the identification information of the external terminal 100', and the third screen information 410 may be stored therein to be matched to the address and transmitted to the server.

The mobile terminal 100 receives the third screen information 410 corresponding to the address.

Referring to FIG. 8A(c), the controller 180 controls the display unit 151 to display the third screen information 410. However, the controller 180 controls the display unit 151 to display first and second source indication 332, 341 to distinguish the sources of the first and the second additional information 330, 340.

The first and the second source indication 332, 341 are displayed adjacent to the first and the second additional information 330, 340, respectively, to display each source thereof. According to the present embodiment, the first source indication 332 for the first additional information 330 entered by the mobile terminal 100 is distinguished from the second source indication 341 for the second additional information 340 entered by all the terminals other than the mobile terminal 100. For example, the first source indication 332 may be displayed as "M", and the second source indication 341 as "O".

The controller 180 compares the identification information of the mobile terminal 100 displaying the third screen information 410 and identification information contained in the additional information, and controls the display unit 151 to display the first source indication 332 if they are the same, and display the second source indication 341 if they are different.

Accordingly, the user can distinguish additional information added by himself or herself from additional information added by another person. As a result, even when first screen information is changed using a plurality of terminals, the user can recognize if current information is added information, information added by his or her mobile terminal 100 or information added by another terminal.

A control method of displaying various sources on additional information will be described with reference to FIG. 8B. As described above, for the first screen information 300, additional information may be entered by a plurality of terminals. According to the present embodiment, a control method of displaying second screen information 400 containing first through third additional information 330, 340, 350 entered by a plurality of terminals, respectively, will be described.

When the address is entered to the address input window, the controller 180 receives second screen information 400 containing the first through third additional information 330, 340, 350 from the server. The controller 180 controls the display unit 151 to display second screen information containing the first additional information 330 and the first source indication 332.

Since the first additional information 330 is entered by the mobile terminal 100, the user can preferentially receive second screen information containing only additional information entered by himself or herself.

The controller 180 controls the display unit 151 to display the second screen information 410 containing the second additional information 340 and the second source indication 341 based on the user's control command applied to the display unit 151 to receive other additional information.

Furthermore, when the user's control command for receiving other additional information is applied again, the controller 180 controls the display unit 151 to display the second screen information 420 containing the third additional information 350 and the third source indication 351.

In other words, the controller 180 controls the display unit 151 to display second screen information containing different additional information based on the user's touch input. The controller 180 may control the display unit 151 to display additional information sequentially entered according to the flow of time on the second screen information, but the display sequence may not be necessarily limited to this.

Referring to FIG. 8B(d), the controller 180 may control the display unit 151 to display second screen information 430 containing the first through the third additional information 330, 340, 350 and the first through the third source indication 332, 341, 351 based on the user's control command. The controller 180 may control the display unit 151 to display an arrow or the like connecting the first through the third additional information 330, 340, 350 to the input position 310.

According to the present embodiment, the user may receive all additional information entered by a plurality of users, and recognize which information entered by which user. Furthermore, a plurality of additional information may be independently displayed based on the user's control.

A control method of limiting the change of the additional information will be described with reference to FIG. 8C.

Figure 8C:
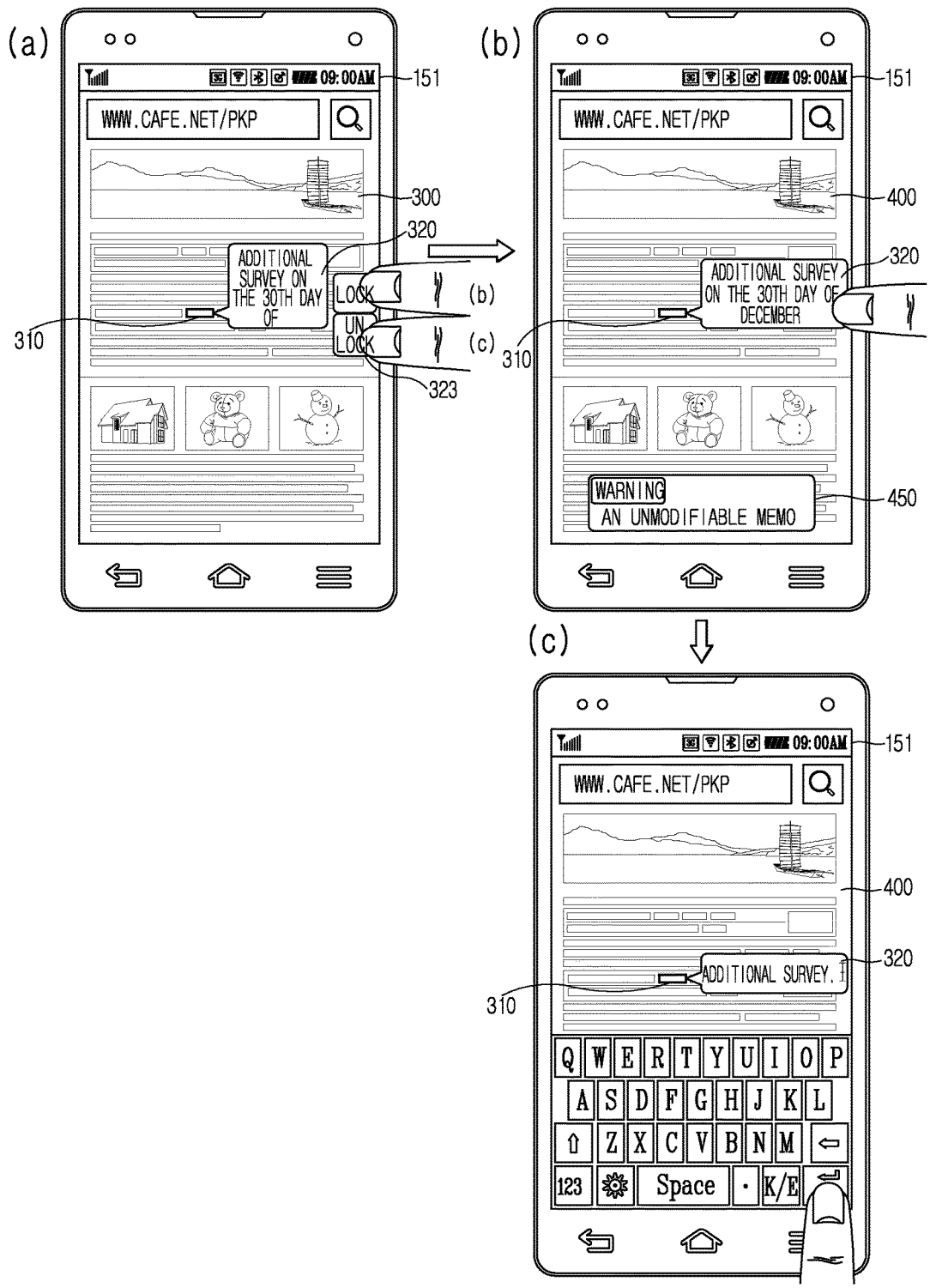

Referring to FIG. 8C(a), the controller 180 controls the display unit 151 to display a graphic image 323 capable of selecting whether or not to change the additional information 320 when the additional information 320 is displayed on the first screen information 300. In other words, the user may select whether or not to change the additional information 320 when entering the additional information 320.

FIG. 8C(b) is a case of setting to limit the change of the additional information 320, namely, a case of displaying a graphic image 323 corresponding to "lock" in FIG. 8C(a).

The controller 180 limits the change of the additional information 320 based on a control command applied to the graphic image 323. In other words, when a control command for modifying the additional information 320 is applied by an external terminal which is different from the mobile terminal 100, an warning window 450 indicating that it is unmodifiable additional information is displayed. For example, a message such as "it is an unmodifiable memo" may be displayed on the warning window 450.

However, it may not be necessarily limited to this, and may be also controlled to disable the re-modification of the mobile terminal 100 to which the additional information 320 is entered.

On the other hand, when a graphic image 323 corresponding to "unlock" in FIG. 8C(a) is displayed, the controller 180 may change the additional information 323 using another terminal as well as the mobile terminal 100.

In other words, when a control command for changing the additional information 320 is applied by another terminal, the controller 180 controls the display unit 151 to switch it to a state for changing the additional information 320 and display the virtual keyboard.

According to the present embodiment, when information is enabled to be continuously changed by a plurality of users, it may limit a change to additional information prepared by himself or herself, thereby forming more accurate information.

Hereinafter, a control method of storing the content of the second screen information in the mobile terminal will be described with reference to FIG. 9.

The controller 180 controls the display unit 151 to display a control window 324 that receives a control command for controlling the second screen information 400 on the second screen information 400. For example, the control window 324 may include "MEMO", "SHARE", and "COPY".

Referring to FIG. 9B, the controller 180 controls the memory 160 to record information on the second screen information 400 containing the address based on a control command applied to the "MEMO". The second screen information 400 matched to the address may be recorded in the storage space of a specific application.

In other words, the user may receive the second screen information from the storage space of the specific application, and receive updated information corresponding to the address again from the server.

Screen information matched to another address is stored in the storage space of the specific application.

On the other hand, referring to FIG. 9C, the controller 180 controls the display unit 151 to copy content contained in the second screen information 400 so as to paste it to a recordable application based on a control command applied to "COPY". In other words, the user can copy all contents contained in the second screen information 400 containing additional information.

However, it may not be necessarily limited to this, and only one region of the second screen information 400 may be also copied and recorded by the user's control.

Accordingly, the user may record information corresponding to second screen information corresponding to the address to the mobile terminal in various forms. As a result, it may be possible to receive information corresponding to the address directly without passing through the process of accessing the server, and receive screen information containing the additional information again even when screen information matched to the address is unable to be received through the server.

Though it is not illustrated in detail, when control command "SHARE" is applied, the controller may control the mobile terminal to share the second screen information 400, thereby allowing another terminal to receive it.

The configurations and methods according to the above-described embodiments will not be applicable in a limited way to the foregoing mobile terminal, and all or part of each embodiment may be selectively combined and configured to make various modifications thereto.

What is claimed is:

1. A mobile terminal, comprising:
 a wireless Internet module connected to a server providing first screen information matched to a preset address;
 a display to display the first screen information;
 a touch sensor to receive a touch input for entering first additional information on the first screen information; and
 a controller to:
  when the preset address is entered, via the display, receive the first additional information, second additional information and third additional information from the server, wherein the second and third additional information was entered by external terminals other than the mobile terminal, display second screen information containing the first screen information and the first additional information,
  in response to a first touch input on the second screen information, display the second additional information on the second screen information and remove the first additional information,
  in response to a second touch input on the second screen information, display the third additional information on the second screen information and remove the second additional information, and
  in response to a third input on the second screen information, display the first, second and third additional information on the second screen information,
 wherein the controller controls the display to sequentially display the first, second and third additional information entered according to a flow of time,
 wherein each of the first, second and third additional information are displayed as respective pop-up windows and in a region in which no content is displayed among the second screen information containing a plurality of contents,
 wherein the respective pop-up windows comprise an arrow connecting corresponding additional information to an entering position indicating that the corresponding additional information is information associated with the entering position, and an edit icon for receiving a control command for modifying the corresponding additional information, and
 wherein in response to entering an edit mode based on the control command applied to the edit icon, the controller controls the display, to display the respective pop-up windows, a state before being edited, a graphic object indicating an edited state and final additional information after being edited.

2. The mobile terminal of claim 1, further comprising:
 a memory to store the first additional information and a specific coordinate of the first screen information at which the first additional information is formed.

3. The mobile terminal of claim 2, wherein the controller controls the wireless Internet module to transmit the address and a signal for the second screen information matched to the address to the server.

4. The mobile terminal of claim 3, wherein the controller controls the memory to store the second screen information by converting it into a hypertext markup language (HTML).

5. The mobile terminal of claim 1, wherein when a modified item is formed on the second screen information by one of the external terminals, the display displays the modified second screen information.

6. The mobile terminal of claim 5, wherein the display displays the second screen information and the modified second screen information.

7. The mobile terminal of claim 5, wherein the first additional information comprises the identification information of the mobile terminal to distinguish it from an item modified by the external terminal.

8. The mobile terminal of claim 1, wherein the controller displays the first additional information when a touch input is applied to a graphic image corresponding to the first additional information and contained in the second screen information.

9. The mobile terminal of claim 1, wherein the first additional information is displayed to cover one region of the first screen information.

10. The mobile terminal of claim 1, wherein the first screen information comprises a plurality of contents having each coordinate, and
 wherein the display changes a region in which the content is displayed when entering the first additional information.

11. The mobile terminal of claim 1, wherein the first additional information comprises the unique information of the mobile terminal, and
 wherein the display displays source indication corresponding to the unique information adjacent to the first additional information.

12. A control method of a mobile terminal, the control method comprising:
 connecting to a server;
 receiving first screen information matched to a specific address from the server, and displaying the first screen information;
 receiving a touch input on a display for entering first additional information;

when the preset address is entered, via the display, receiving the first additional information, second additional information and third additional information from the server, wherein the second and third additional information was entered by external terminals other than the mobile terminal;

displaying second screen information containing the first screen information and the first additional information;

in response to a first touch input on the second screen information, displaying the second additional information on the second screen information and removing the first additional information;

in response to a second touch input on the second screen information, displaying the third additional information on the second screen information and removing the second additional information; and in response to a third input on the second screen information, displaying the first, second and third additional information on the second screen information, wherein the entered first, second and third additional information are sequentially displayed according to a flow of time, wherein each of the first, second and third additional information are displayed as respective pop-up windows and in a region in which no content is displayed among the second screen information containing a plurality of contents, wherein the respective pop-up windows comprise an arrow connecting corresponding additional information to an entering position indicating that the corresponding additional information is information associated with the entering position, and an edit icon for receiving a control command for modifying the corresponding additional information, and wherein in response to entering an edit mode based on a control command applied to the edit icon, the controller controls the display, to display the respective pop-up windows, a state before being edited, graphic object indicating an edited state edited and final additional information after being edited.

13. The control method of claim 12, further comprising:
storing the second screen information by matching it to the address.

14. The control method of claim 13, further comprising:
displaying second screen information containing the first additional information matched to the address and changed by one of the external terminals when connecting to the address again.

15. The control method of claim 12, wherein said receiving a touch input for entering first additional information comprises:
recognizing the unique information of the mobile terminal; and
receiving a control command for limiting the change of the first additional information by an external terminal having another unique information.

* * * * *